United States Patent [19]
Alvey et al.

[11] Patent Number: 6,133,827
[45] Date of Patent: *Oct. 17, 2000

[54] SPEED DEPENDENT VEHICLE COURTESY LAMP CONTROL FOR AN AUTOMOBILE

[75] Inventors: Raymond Scott Alvey, Utica; Ronald Patrick Brombach, Berkley, both of Mich.

[73] Assignee: Ford Global Technologies, Inc., Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/084,502

[22] Filed: Jul. 1, 1993

[51] Int. Cl.[7] ........................................... B60Q 1/00
[52] U.S. Cl. ........................ 340/438; 340/441; 340/457
[58] Field of Search ................................ 340/438, 441, 340/457, 457.1, 459, 522

[56] References Cited

U.S. PATENT DOCUMENTS

| | | | |
|---|---|---|---|
| 3,641,488 | 2/1972 | Mullin | 340/459 |
| 3,829,828 | 8/1974 | Hutchinson et al. | 340/466 |
| 4,426,691 | 1/1984 | Kawasaki | 369/21 |
| 5,265,468 | 11/1993 | Holst et al. | 340/441 |

*Primary Examiner*—Daryl Pope
*Attorney, Agent, or Firm*—Mark L. Mollon

[57] ABSTRACT

An interior lamp control using a microprocessor to monitor the ignition switch, door ajar switches, and vehicle speed deactivates the interior lamp if vehicle speed exceeds a speed threshold even though the state of the input switches otherwise indicates that the interior lamp should be illuminated. The lamp will not again illuminate until after the speed decreases below a lower speed threshold.

14 Claims, 3 Drawing Sheets

SPEED DEPENDENT VEHICLE COURTESY LAMP CONTROL FOR AN AUTOMOBILE

BACKGROUND OF THE INVENTION

The invention relates generally to a controllable light and more specifically to a controllable interior lamp of an automobile.

Motor vehicles have doors for access to the passenger compartment. The doors typically activate a switch that triggers the illumination of the interior lamps of the vehicle upon the opening of the door. Minivans, fullsize vans, sport utility vehicles and station wagons also have an access door in the rear of the vehicle. Typically, the rear access door is a liftgate door or a set of double panel doors. The interior dome lamp also illuminates when the rear access door is opened. If, for example, any door switch malfunctions, the interior lamp might remain illuminated when it should otherwise turn off.

SUMMARY OF THE INVENTION

It is therefore an object of the invention to have an interior lamp control system that extinguishes the interior lamp if the liftgate door remains ajar after the vehicle attains a certain speed.

Briefly, a preferred embodiment of the present invention includes a position sensing means for generating a door ajar signal responsive to the door being ajar and a speed sensing means for generating a speed signal responsive to the speed of the vehicle. A control means is coupled to the position sensing means and to the speed sensing means for controlling the illumination of the interior lamp in response to the door ajar signal and the speed signal.

One advantage of the invention is that the interior lamp will be extinguished after the vehicle-exceeds a certain speed threshold, but will not illuminate again until the vehicle reaches a lower speed threshold thereby preventing the lamp from cycling on and off when driving at or near one of the threshold speeds.

DETAILED DESCRIPTION OF THE PREFERRED EMBODIMENT

Figure 1:
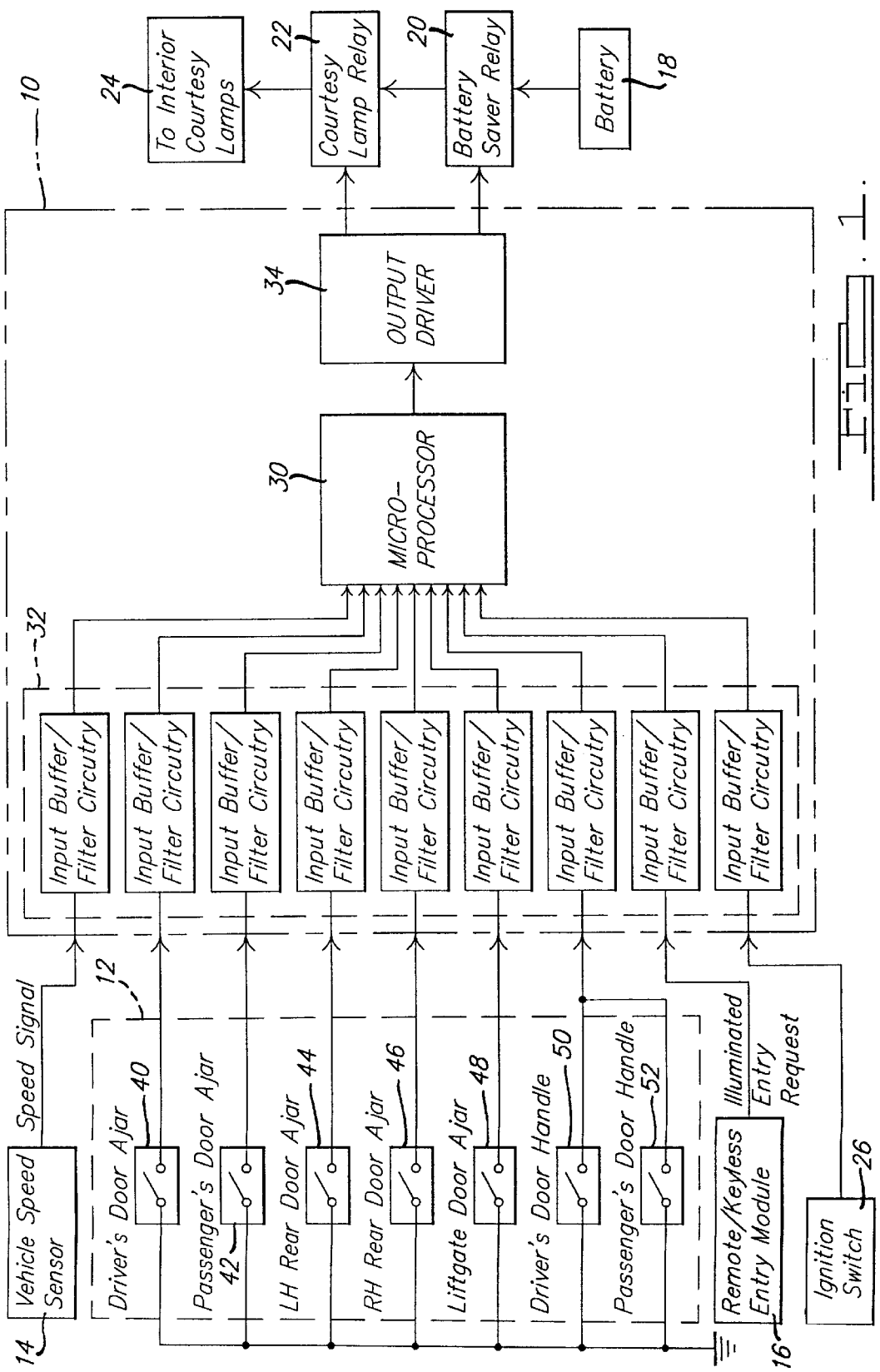
FIG. 1 is a block diagram of the apparatus of the system.

Referring now to FIG. 1, the system is comprised of door position inputs 12, a speed sensor 14, a remote keyless entry module 16, and an ignition switch 26 that provide input signals to an electronic control module 10. Electronic control module 10 outputs signals to a battery saver relay 20 and a courtesy lamp relay 22 to control the connection of a battery 18 to interior courtesy lamps 24.

Electronic control module (ECM) 10 is comprised of a microprocessor 30 connected to an input buffer section 32, and an output driver 34. The three components of ECM 10 are placed in one location within a motor vehicle for ease of packaging. The signals coupled through input buffer 32 to microprocessor 30 are used by the microprocessor to control various functions such as turning on and off interior courtesy lamps 24 in response to various inputs such as vehicle speed and door ajar signals. Output driver 34 receives a control signal from the microprocessor 30 and generates a control signal capable of controlling a relay such as courtesy lamp relay 22 or battery saver lamp relay 20. Relays 20 and 22 control the application of battery power 18 to interior courtesy lamps 24.

Input buffer 32 receives inputs from remote locations and preprocesses the signals before they are received by microprocessor 30. For example, input buffer 32 can contain a lowpass filter to filter out noise from being passed to microprocessor 30. Input buffer 32 is typically a series of a number of individual input buffers depending on the number of input signals for microprocessor 32.

Vehicle speed sensor 14 provides a voltage signal proportional the vehicle speed to microprocessor 30 through input buffer 32. Vehicle speed sensor 14 can be, for example, a variable reluctance sensor located in a transmission that provides a 10 Volt peak analog signal at maximum speed or another speed sensor such as that used for anti-lock brakes which provides a similar signal.

Door position input 12 is comprised of driver's door ajar switch 40, a passenger's door ajar switch 42, a lefthand rear door ajar switch 44, a righthand rear door ajar switch 46, a liftgate door ajar switch 48, a driver's door handle switch 50, and a passenger's door handle switch 52. The number of switches depends on the vehicle door configuration. For example a four-door sport/utility vehicle would have the above-mentioned switches whereas, a typical van may not have a lefthand rear door switch. Door ajar switches 40–48 provide an open circuit to input buffer 32 when the door is closed and a ground signal when the door is ajar. Door handle switches 50–52 provide a ground signal to input buffer 32 when the exterior door handle is actuated to open the door, and an open signal when the handle is at rest.

Remote/keyless entry module 16 is used to control lock and unlock functions which can be actuated by either a remote transmitter or a keypad located on a door of the vehicle. In conjunction with the unlock function, remote/keyless entry module 16 generates an illuminated entry request to microprocessor 30 through input buffer 32 for turning on the interior courtesy lamps 24 of the vehicle.

Ignition switch 26 is also an input to ECM 10 through input buffer 32. Ignition switch 26 generates a voltage signal based on the whether the switch is in the off state or the on state.

Battery saver relay 20 is used to eliminate vehicle power to vehicle accessories including all lamps including interior lamps 24 if the vehicle is not started after an elapsed period of time after their initial operation. The time period can be, for example, 40 minutes. This prevents excessive power depletion from battery 18. Microprocessor 30 keeps track of the elapsed time and controls battery saver relay 20.

Courtesy lamp relay 22 is used to control interior courtesy lamps 24. In normal operation, microprocessor 30 sends a control signal via output driver 34 to illuminate interior courtesy lamps 24 if a door ajar signal is received from switches 40–42 or sends a control signal to extinguish interior courtesy lamps following a predetermined delay (e.g., 25 seconds) after all door ajar signals terminate. Interior courtesy lamps 24 can include lamps such as the dome lamp, trunk lamp the cargo lamp, keyhole lamps, and under-the-instrument-panel lamps or groups thereof.

Figure 2:
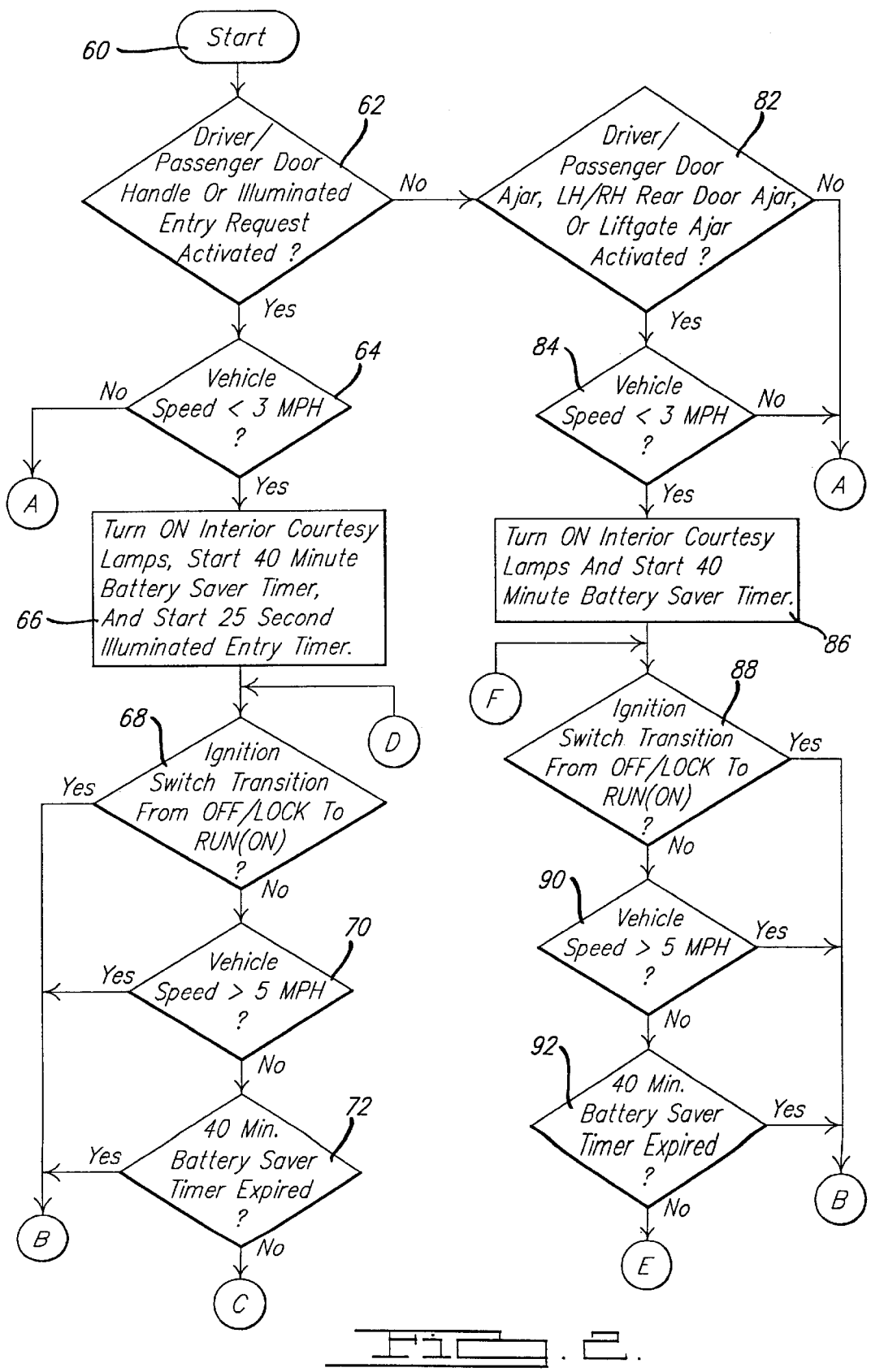
FIGS. 2–3 are flowcharts of the present invention.
Figure 3:
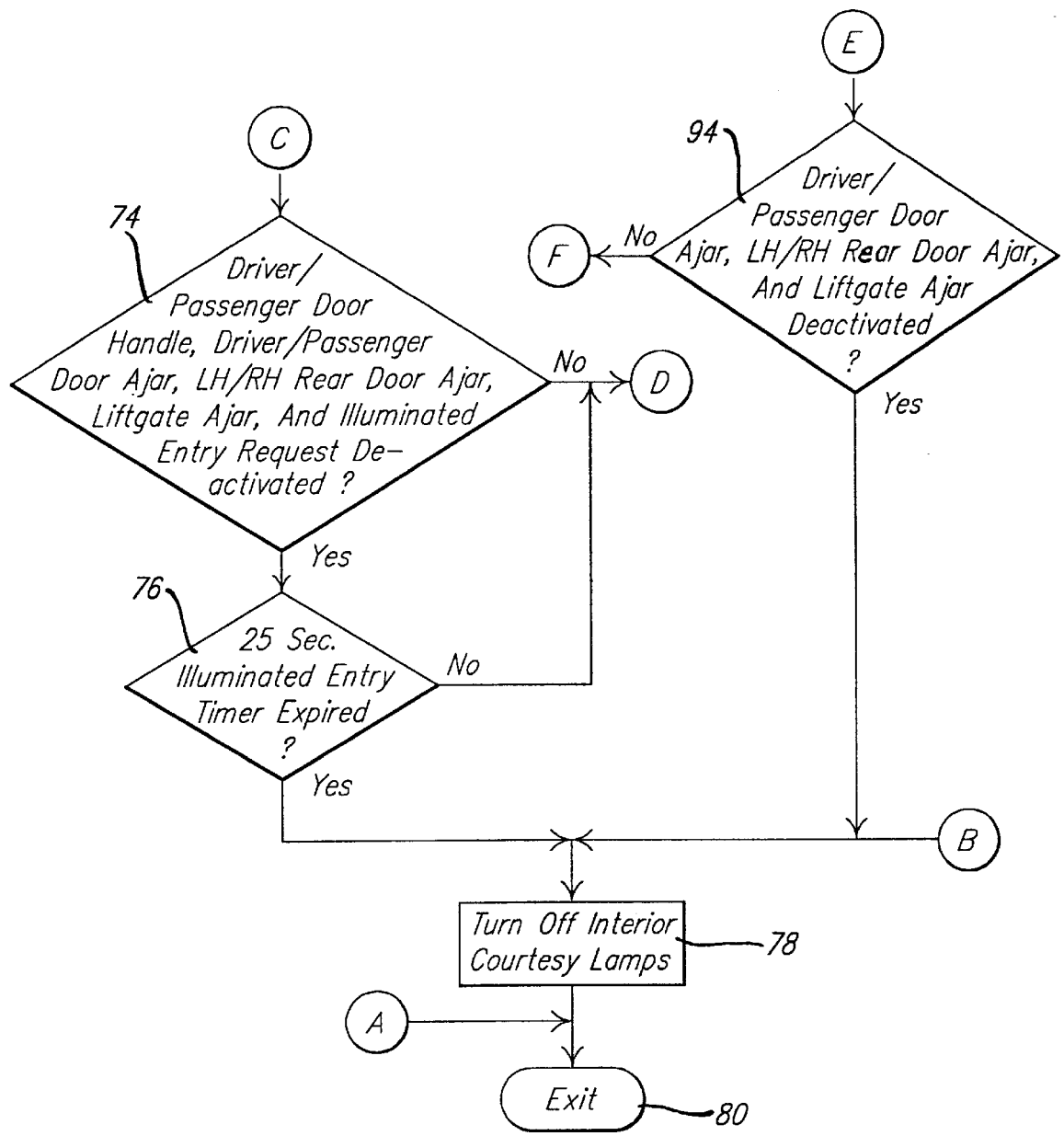

Referring now to FIGS. 2 and 3, the control of the interior lamps can be controlled as a subroutine of a larger control program in the microprocessor. The following subroutine is a preferred method of operating the interior lamps of a vehicle.

The subroutine starts in step 60. Step 62 checks whether door handle switches or an illuminated entry request are activated. If either is activated, step 64 compares vehicle speed to a first speed threshold (e.g., 3 miles per hour). If vehicle speed is greater than or equal to 3 miles per hour, the subroutine is exited in step 80. If the speed is less than 3 miles per hour, the interior courtesy lamps are illuminated (e.g., the driver signal to lamp relay 22 is initiated) and a 40 minute battery saving timer and a 25 second entry timer are started in step 66.

If the ignition switch signal transitions from off to on in step 68, the interior courtesy lamps are extinguished in step 78 (i.e., the driver signal is terminated) and the subroutine is exited in step 80. Step 70 compares vehicle speed with a second speed threshold (e.g., 5 miles per hour). If the speed is greater than 5 miles per hour, the lamps are extinguished in step 78 and the subroutine is returned in step 80. If the speed is less than 5 miles per hour, step 72 is executed to check if any vehicle lamps have been illuminated for 40 minutes or longer. If some lamps have been illuminated for 40 minutes or longer then the lamps are extinguished in step 78 and the subroutine is returned in step 80. If 40 minutes has not expired in step 40, step 74 checks if the door handle switches, door ajar switches and illuminated entry request are deactivated. If they are not deactivated, step 68 is executed. If the switches are deactivated, step 76 is executed to see if the 25 second illuminated entry timer has expired. If 25 seconds has not expired, the subroutine returns to step 68. If the 25 second has expired, the courtesy lamps are extinguished in step 78 and the subroutine is exited in step 80.

Returning to step 62, if a door handle switch or illuminated entry request are not activated, step 82 determines if any door ajar switches indicate an open door. If no door is ajar, the subroutine is exited via step 80. If any door is ajar, step 84 compares vehicle speed with the first speed threshold. If the speed is not less than 3 miles per hour, the subroutine is exited via step 80. If the vehicle speed is less than 3 miles per hour, step 86 is executed to illuminate the interior courtesy lamps and to start the 40 minute battery saving timer and start the 25 second entry timer. Step 88 checks for a transition of the ignition switch from the off position to the on position. If a transition is detected, the lamps are extinguished in step 78 and the subroutine is exited in step 80. If no transition is detected, step 90 compares vehicle speed with the second speed threshold. If vehicle speed is greater than 5 miles per hour, the lamps are extinguished in step 78 and the subroutine is exited in step 80. If the speed is not over 5 miles per hour, step 92 determines if the 40 minute battery saver has expired. If the lamps have been on for 40 minutes, they are extinguished in step 78 and the subroutine is excited in step 80. If 40 minutes has not yet expired in step 92, step 78 detects whether the door ajar switches are deactivated. If the door ajar switches are deactivated, the interior courtesy lamps are extinguished and the subroutine is returned in step 80. If the switches have not been deactivated, the subroutine returns to step 88.

In operation, if the driver uses the driver or passenger exterior door handle to enter the vehicle and the vehicle speed is less than 3 miles per hour, the interior light will stay on until one of the conditions in steps 68–76 is met. If neither the door handle nor the illuminated entry request is active at the time, and the door is ajar with the speed under 3 miles per hour, the loop of steps 88–94 will be executed. The three mile per hour comparison in steps 64 and 84 provides a hysteresis effect with the 5 mile per hour comparison in steps 70 and 90, respectively. In other words, the lamps may be turned on if vehicle speed is below 3 miles per hour and they will remain on until vehicle speed increases to 5 miles per hour. The lamps will not go on again until vehicle speed drops below 3 miles per hour. This sets up a hysteresis effect so that if a relatively constant speed of 5 miles per hour is driven, the lamps will not cycle on and off.

What is claimed is:

1. A system for controlling the operation of a courtesy lamp for illuminating an interior of a motor vehicle, comprising:

position sensing means for generating a door ajar signal responsive to said door being ajar;

speed sensing means for generating a speed signal responsive to the speed of said vehicle; and control means coupled to said position sensing means and to said speed sensing means for controlling illumination of said courtesy lamp in response to said door ajar signal and said speed signal, wherein said control means activates said courtesy lamp when said door is ajar and said speed signal is less than a first speed threshold and wherein said control means deactivates said courtesy lamp when said door is ajar and said speed signal is greater than a second speed threshold, said second speed threshold being greater than said first speed threshold.

2. The system as in claim 1 wherein said control means reactivates said courtesy lamp if said door ajar signal is present and said speed signal falls below said first speed threshold.

3. The system as in claim 1 wherein said first speed threshold is 3 miles per hour.

4. The system as in claim 1 wherein said second threshold is 5 miles per hour.

5. The system as in claim 1 further comprising a controllable switch means coupled between said courtesy lamp and said control means for selectably coupling said courtesy lamp to a power source.

6. The system as in claim 5 wherein said control means further comprises an output driver for outputting a driving signal to said controllable switch means.

7. The system as in claim 1 wherein said control means comprises an input buffer for receiving said speed signal and said door ajar signals.

8. The system as in claim 1 wherein said door comprises a liftgate.

9. The system as in claim 1 wherein said courtesy lamp is a dome lamp.

10. A method for controlling a courtesy lamp for illuminating an interior of a motor vehicle having at least one door, comprising the steps of:

generating a door ajar signal indicative of the position of said door;

generating a speed signal indicative of vehicle speed; and controlling illumination of said courtesy lamp in response to said speed signal and said door ajar signal such that said courtesy lamp is activated when said door is ajar and said speed signal is less than a first speed threshold and wherein said courtesy lamp is deactivated when said door is ajar and said speed signal is greater than a second speed threshold, said second speed threshold being greater than said first speed threshold.

11. The method as in claim 10 wherein the step of controlling illumination of said courtesy lamp further comprises reactivating said courtesy lamp if said door ajar signal is present and said speed signal falls below said first speed threshold.

12. A method for controlling a courtesy lamp for illuminating an interior of a motor vehicle having at least one door, comprising the steps of:

sensing whether said door is ajar;

sensing vehicle speed;

turning on said courtesy lamp in response to said door being ajar while said vehicle speed is less than a first speed threshold; and turning off said courtesy lamp in response to said vehicle speed being greater than a second speed threshold in spite of said door being ajar, said second speed threshold being greater than said first speed threshold.

13. The method as in claim 12 wherein said first speed threshold is 3 miles per hour.

14. The method as in claim 12 wherein said second speed threshold is 5 miles per hour.

* * * * *